(12) United States Patent
Rathay et al.

(10) Patent No.: US 10,480,327 B2
(45) Date of Patent: Nov. 19, 2019

(54) COMPONENTS HAVING CHANNELS FOR IMPINGEMENT COOLING

(71) Applicant: GENERAL ELECTRIC COMPANY, Schenectady, NY (US)

(72) Inventors: Nicholas William Rathay, Rock City Falls, NY (US); James Albert Tallman, Glenville, NY (US); Gary Michael Itzel, Simpsonville, SC (US)

(73) Assignee: General Electric Company, Schenectady, NY (US)

( * ) Notice: Subject to any disclaimer, the term of this patent is extended or adjusted under 35 U.S.C. 154(b) by 360 days.

(21) Appl. No.: 15/397,249

(22) Filed: Jan. 3, 2017

(65) Prior Publication Data

US 2018/0187552 A1 Jul. 5, 2018

(51) Int. Cl.
| | |
|---|---|
| *F01D 5/18* | (2006.01) |
| *F02C 3/14* | (2006.01) |
| *F01D 25/08* | (2006.01) |
| *F01D 9/02* | (2006.01) |

(52) U.S. Cl.
CPC ............... *F01D 5/18* (2013.01); *F01D 5/187* (2013.01); *F01D 25/08* (2013.01); *F02C 3/14* (2013.01); *F01D 9/02* (2013.01); *F05D 2220/32* (2013.01); *F05D 2240/35* (2013.01); *F05D 2260/201* (2013.01)

(58) Field of Classification Search
CPC . F01D 5/18; F01D 5/187; F01D 5/147; F01D 25/08; F02C 7/12; F02C 7/16; F02C 7/18; F02C 7/185
See application file for complete search history.

(56) References Cited

U.S. PATENT DOCUMENTS

| | | | |
|---|---|---|---|
| 5,060,472 A | 10/1991 | Schirtzinger | |
| 5,363,654 A | 11/1994 | Lee | |
| 5,467,815 A | 11/1995 | Naumann et al. | |
| 5,647,202 A | 7/1997 | Althaus | |
| 5,775,108 A | 7/1998 | Ansart et al. | |
| 5,827,043 A | 10/1998 | Fukuda et al. | |
| 6,000,908 A | 12/1999 | Bunker | |
| 8,152,463 B2 | 4/2012 | Haselbach et al. | |
| 8,523,523 B2 | 9/2013 | Townes et al. | |
| 8,667,682 B2 | 3/2014 | Lee et al. | |
| 9,010,124 B2 | 4/2015 | Chandler et al. | |
| 2009/0324385 A1* | 12/2009 | Liang | F01D 5/187 |
| | | | 415/115 |
| 2015/0118013 A1 | 4/2015 | Kvasnak et al. | |
| 2016/0131365 A1 | 5/2016 | Tu et al. | |
| 2016/0333735 A1* | 11/2016 | Bunker | F23R 3/005 |

* cited by examiner

*Primary Examiner* — Craig Kim
(74) *Attorney, Agent, or Firm* — Armstrong Teasdale LLP

(57) ABSTRACT

A component configured for impingement cooling includes an inner wall defining a plurality of apertures. Each aperture of the plurality of apertures is configured to emit a cooling fluid therethrough. The component also includes an outer wall spaced from the inner wall. The outer wall and the inner wall extend along a longitudinal axis of the component. The component further includes a plurality of angled walls extending between the inner wall and the outer wall. The plurality of angled walls define a plurality of angled channels in fluid communication with the plurality of apertures. Each angled wall of the plurality of angled walls extends at an acute angle relative to the longitudinal axis.

18 Claims, 6 Drawing Sheets

COMPONENTS HAVING CHANNELS FOR IMPINGEMENT COOLING

BACKGROUND

The field of the disclosure relates generally to components that include internal impingement cooling, and more particularly to components that include a plurality of angled channels for impingement cooling.

Some components, such as hot gas path components of gas turbines, are subjected to high temperatures. At least some such components have internal cooling systems to maintain the component below a threshold temperature. During operation the internal cooling systems provide a cooling fluid into an impingement cavity defined between an outer wall and an inner wall. However, in at least some components, such impingement cavities experience increased stresses due to the thermal expansion of portions of the component such as the outer wall. For example, in some components, the outer wall has a higher temperature than the inner wall during operation. Accordingly, the outer wall expands due to thermal expansion at a different rate than the inner wall and support members for the outer wall experience increased stress.

At least some components include recovery plenums for recovering cooling fluid after the cooling fluid flows through the impingement cavity. However, the pressure of the cooling fluid varies along the recovery plenums. For example, in at least some components, the cooling fluid enters the recovery plenum from opposite sides and generates flow structures which cause pressure changes along the recovery plenum. Due to the pressure changes, a disproportional amount of cooling fluid bypasses an upstream portion of the recovery plenum and enters a downstream portion of the recovery plenum. As a result, the cooling system has a decreased cooling efficiency. In addition, the uniformity of the component cooling is decreased.

BRIEF DESCRIPTION

In one aspect, a component configured for impingement cooling is provided. The component includes an inner wall defining a plurality of apertures. Each aperture of the plurality of apertures is configured to emit a cooling fluid therethrough. The component also includes an outer wall spaced from the inner wall. The outer wall and the inner wall extend along a longitudinal axis of the component. The component further includes a plurality of angled walls extending between the inner wall and the outer wall. The plurality of angled walls define a plurality of angled channels in fluid communication with the plurality of apertures. Each angled wall of the plurality of angled walls extends at an acute angle relative to the longitudinal axis.

In another aspect, a rotary machine is provided. The rotary machine includes a combustor section configured to generate combustion gases and a turbine section configured to receive the combustion gases from the combustor section and produce mechanical rotational energy therefrom. A path of the combustion gases through the rotary machine defines a hot gas path. The rotary machine also includes a component proximate the hot gas path. The component includes an inner wall and an outer wall spaced from the inner wall. The inner wall defines a plurality of apertures configured to emit a cooling fluid therethrough. The outer wall and the inner wall extend along a longitudinal axis of the component. The component further includes a plurality of angled walls extending between the inner wall and the outer wall. The plurality of angled walls define a plurality of angled channels in fluid communication with the plurality of apertures. Each angled wall of the plurality of angled walls extends at an acute angle relative to the longitudinal axis.

DRAWINGS

DETAILED DESCRIPTION

In the following specification and the claims, reference will be made to a number of terms, which shall be defined to have the following meanings.

The singular forms "a", "an", and "the" include plural references unless the context clearly dictates otherwise.

"Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms such as "about," "approximately," and "substantially" is not to be limited to the precise value specified. In at least some instances, the approximating language may correspond to the precision of an instrument for measuring the value. Here and throughout the specification and claims, range limitations may be identified. Such ranges may be combined and/or interchanged, and include all the sub-ranges contained therein unless context or language indicates otherwise.

The systems and methods described herein provide components including a plurality of angled walls directing impingement cooling through angled channels. The angled walls provide support to the component and reduce stresses caused during thermal expansion of the component. In particular, the angled walls extend from an inner wall to an outer wall of the component to support the outer wall during operation. In addition, the angled channels direct cooling flow into a recovery plenum and reduce pressure losses along the recovery plenum. As a result, the embodiments described herein increase uniformity and efficiency of impingement cooling of components.

Figure 1:
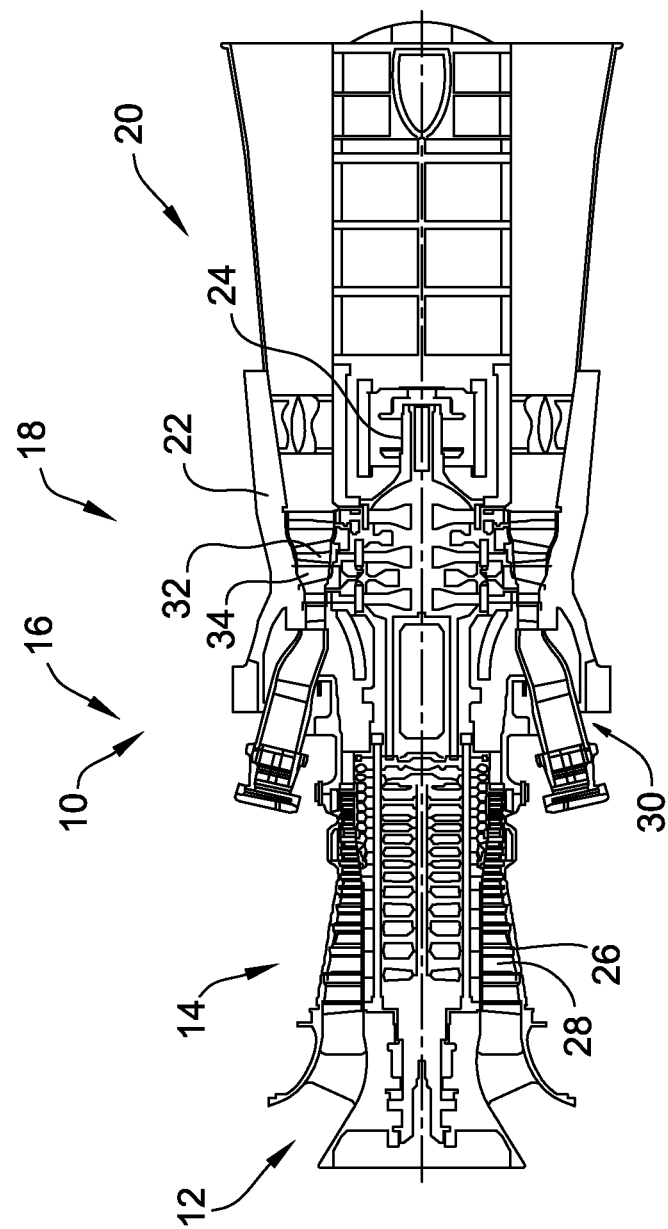
FIG. 1 is a schematic diagram of an exemplary rotary machine.

FIG. 1 is a schematic view of an exemplary rotary machine 10. In the exemplary embodiment, rotary machine 10 is a gas turbine that includes an intake section 12, a compressor section 14 coupled downstream from intake section 12, a combustor section 16 coupled downstream from compressor section 14, a turbine section 18 coupled downstream from combustor section 16, and an exhaust section 20 coupled downstream from turbine section 18. A generally tubular casing 22 at least partially encloses one or more of intake section 12, compressor section 14, combustor section 16, turbine section 18, and exhaust section 20. In alternative embodiments, rotary machine 10 is any rotary machine that includes components formed with internal passages as described herein. Moreover, some embodiments described herein are applicable in any application that involves cooling a component, and not necessarily including a rotary machine.

In the exemplary embodiment, turbine section 18 is coupled to compressor section 14 via a rotor shaft 24. It should be noted that, as used herein, the term "couple" is not limited to a direct mechanical, electrical, and/or communication connection between components, but may also include an indirect mechanical, electrical, and/or communication connection between multiple components.

During operation of rotary machine 10, intake section 12 channels air towards compressor section 14. Compressor section 14 compresses the air to a higher pressure and temperature. More specifically, rotor shaft 24 imparts rotational energy to at least one circumferential row of compressor blades 26 coupled to rotor shaft 24 within compressor section 14. In the exemplary embodiment, each row of compressor blades 26 is preceded by a circumferential row of compressor stator vanes 28 extending radially inward from casing 22. Stator vanes 28 direct the air flow into compressor blades 26. The rotational energy of compressor blades 26 increases a pressure and temperature of the air. Compressor section 14 discharges the compressed air towards combustor section 16.

In combustor section 16, the compressed air is mixed with fuel and ignited to generate combustion gases that are channeled towards turbine section 18. More specifically, combustor section 16 includes at least one combustor 30, in which a fuel, for example, natural gas and/or fuel oil, is injected into the air flow, and the fuel-air mixture is ignited to generate high temperature combustion gases that are channeled towards turbine section 18.

Turbine section 18 converts the thermal energy from the combustion gas stream to mechanical rotational energy. More specifically, the combustion gases impart rotational energy to at least one circumferential row of rotor blades 32 coupled to rotor shaft 24 within turbine section 18. In the exemplary embodiment, each row of rotor blades 32 is preceded by a circumferential row of turbine stator vanes 34 extending radially inward from casing 22. Stator vanes 34 direct the combustion gases into rotor blades 32. In some embodiments, rotor shaft 24 is coupled to a load (not shown) such as, but not limited to, an electrical generator and/or a mechanical drive application. The exhausted combustion gases flow downstream from turbine section 18 into exhaust section 20. A path of the combustion gases through rotary machine 10 defines a hot gas path of rotary machine 10. Components of rotary machine 10 proximate the hot gas path, such as blades 32 and stator vanes 34, are subjected to high temperatures during operation of rotary machine 10.

Figure 2:
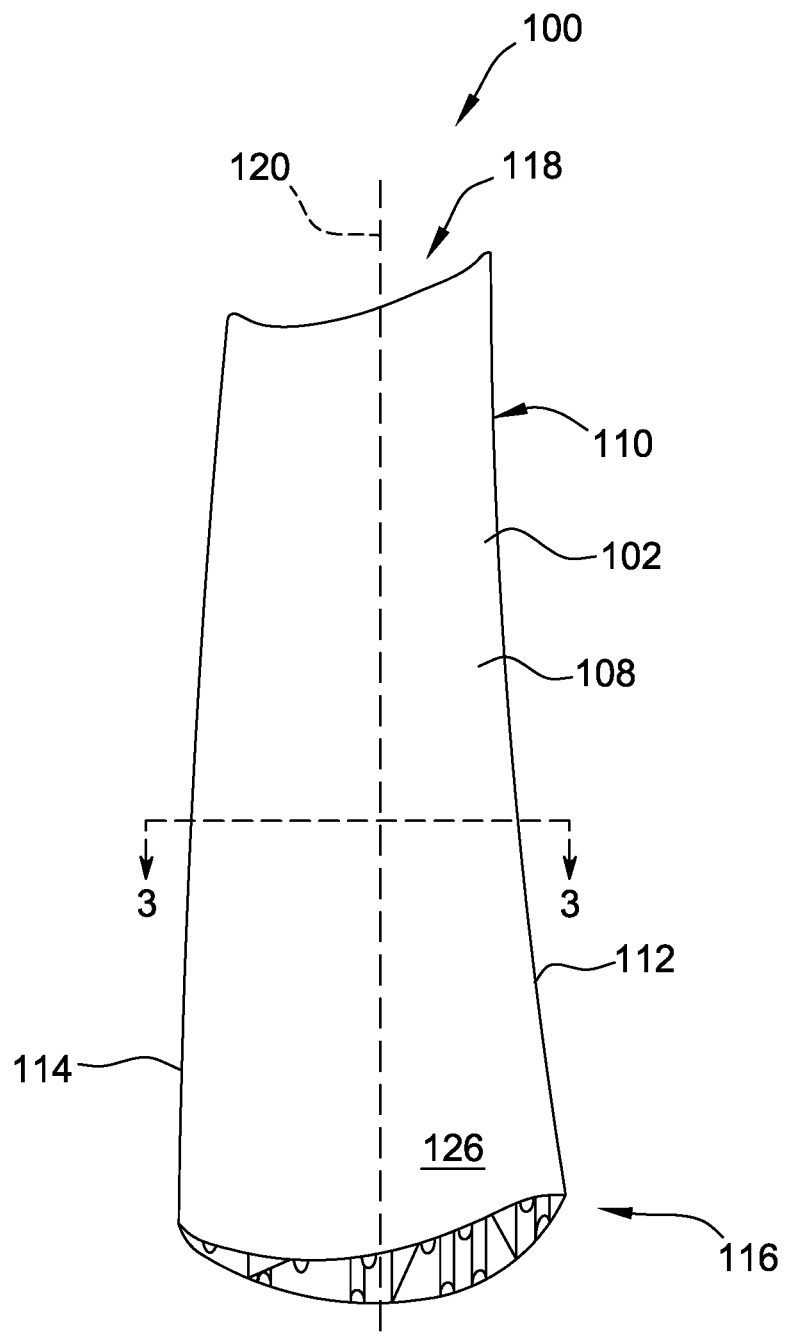
FIG. 2 is a schematic perspective view of an exemplary component for use with the rotary machine shown in FIG. 1.
Figure 3:
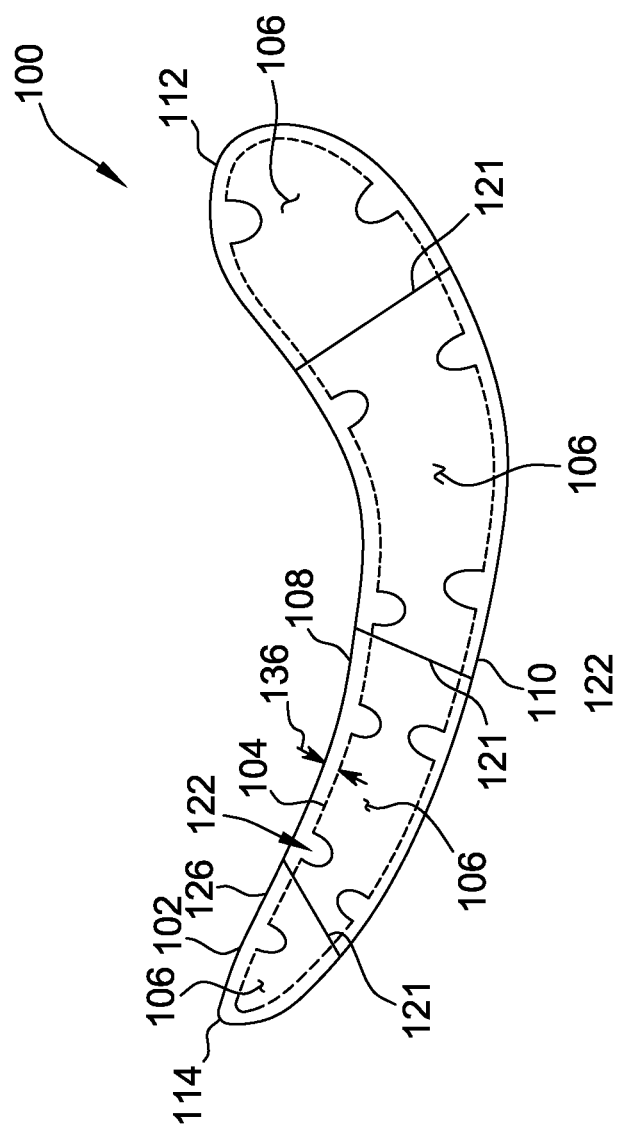
FIG. 3 is a cross-section of the component shown in FIG. 2, taken along lines 3-3 shown in FIG. 2.

FIG. 2 is a schematic perspective view of an exemplary component 100 for use with rotary machine 10 (shown in FIG. 1). FIG. 3 is a cross-section of component 100, taken along lines 3-3 (shown in FIG. 2). In the exemplary embodiment, component 100 is one of rotor blades 32 (shown in FIG. 1) or stator vanes 34 (shown in FIG. 1) and is subjected to high temperatures during operation of rotary machine 10 (shown in FIG. 1). In alternative embodiments, component 100 is any component that is exposed to a high temperature environment, such as a combustor liner, a shroud, and a vane endwall.

In the exemplary embodiment, component 100 includes an outer wall 102, an inner wall 104, and at least one supply plenum 106. Inner wall 104 is positioned interiorly to outer wall 102 and at least partially defines four supply plenums 106 interior thereto. During operation, a cooling fluid is provided to supply plenums 106 to facilitate maintaining component 100 below a desired temperature to facilitate component 100 withstanding the hot combustion gases throughout its service life. In alternative embodiments, component 100 includes any void and/or plenum that enables component 100 to operate as described herein.

Also, in the exemplary embodiment, component 100, e.g., rotor blade 32 (shown in FIG. 1) or stator vane 34 (shown in FIG. 1), includes a pressure side 108 and an opposite suction side 110. Each of pressure side 108 and suction side 110 extends from a leading edge 112 to an opposite trailing edge 114. In addition, component 100 extends from a root end 116 to an opposite tip end 118. A longitudinal axis 120 of component 100 extends through root end 116 and tip end 118. In the exemplary embodiment, outer wall 102 extends circumferentially between leading edge 112 and trailing edge 114, and also extends longitudinally between root end 116 and tip end 118. In alternative embodiments, component 100 has any configuration that enables component 100 to operate as described herein.

In addition, in the exemplary embodiment, each supply plenum 106 extends from root end 116 to proximate tip end 118. Each supply plenum 106 is defined by inner wall 104 and at least one partition wall 121 that extends at least partially between pressure side 108 and suction side 110. Each partition wall 121 extends from outer wall 102 of pressure side 108 to outer wall 102 of suction side 110. In alternative embodiments, component 100 includes any supply plenum 106 that enables component 100 to operate as described herein. For example, in some embodiments, component 100 includes a single supply plenum 106. In further embodiments, component 100 includes partition wall 121 extending from inner wall 104 of pressure side 108 to inner wall 104 of suction side 110. In further embodiments, partition wall 121 extends from inner wall 104 to outer wall 102 of pressure side 108, and/or from inner wall 104 to outer wall 102 of suction side 110.

Moreover, in the exemplary embodiment, component 100 further includes at least one recovery plenum 122 in flow communication with at least one angled channel 124, such that each recovery plenum 122 provides a return fluid flow path for fluid used for impingement cooling of outer wall 102. For example, in the exemplary embodiment, inner wall 104 at least partially defines a plurality of recovery plenums 122 extending adjacent a plurality of angled channels 124. Also in the exemplary embodiment, each recovery plenum 122 extends from root end 116 to proximate tip end 118. In alternative embodiments, component 100 includes any recovery plenum 122 that enables component 100 to function as described herein. For example, in some embodiments, recovery plenums 122 extend in any direction such as along a curve of inner wall 104. In further embodiments, multiple recovery plenums extend along a single axis.

Figure 4:
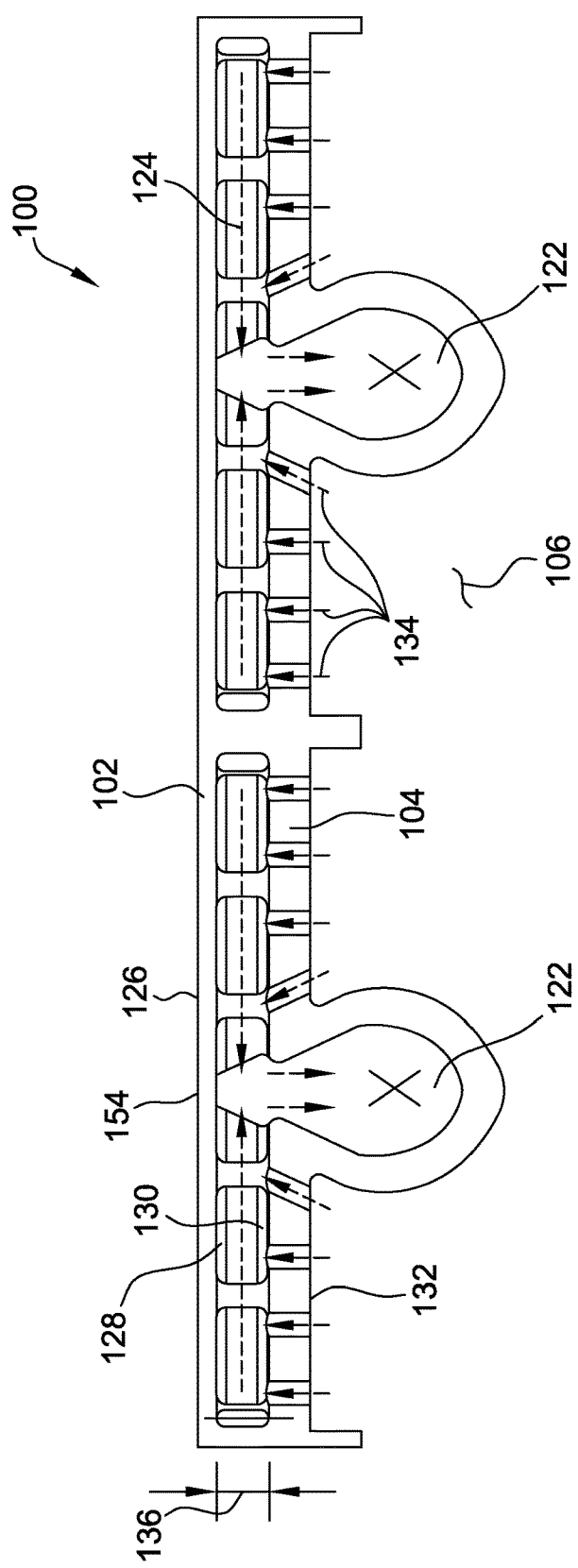
FIG. 4 is a schematic sectional view of a portion of the component shown in FIG. 2.

FIG. 4 is a schematic sectional view of a portion of component 100. Outer wall 102 includes an exterior surface 126 and an interior surface 128. Inner wall 104 includes a first surface 130 and a second surface 132. In addition, inner wall 104 defines a plurality of apertures 134 extending from first surface 130 to second surface 132. In the exemplary embodiment, outer wall 102 and inner wall 104 are integrally formed. In alternative embodiments, component 100 includes any wall that enables component 100 to operate as described herein.

In the exemplary embodiment, at least a portion of inner wall 104 extends circumferentially and longitudinally adjacent at least a portion of outer wall 102 and is separated therefrom by an offset distance 136. In particulate, first surface 130 of inner wall 104 is opposite and spaced from interior surface 128 of outer wall 102 such that offset distance 136 is defined between first surface 130 and interior surface 128. In the exemplary embodiment, offset distance 136 is selected to facilitate effective impingement cooling of outer wall 102 by cooling fluid supplied through plenums 106 and emitted through apertures 134 defined in inner wall 104 towards interior surface 128 of outer wall 102. For example, but not by way of limitation, offset distance 136 varies circumferentially and/or longitudinally along component 100 to facilitate local cooling requirements along respective portions of outer wall 102. In alternative embodiments, component 100 has any offset distance 136 that enables component 100 to operate as described herein.

Figure 5:
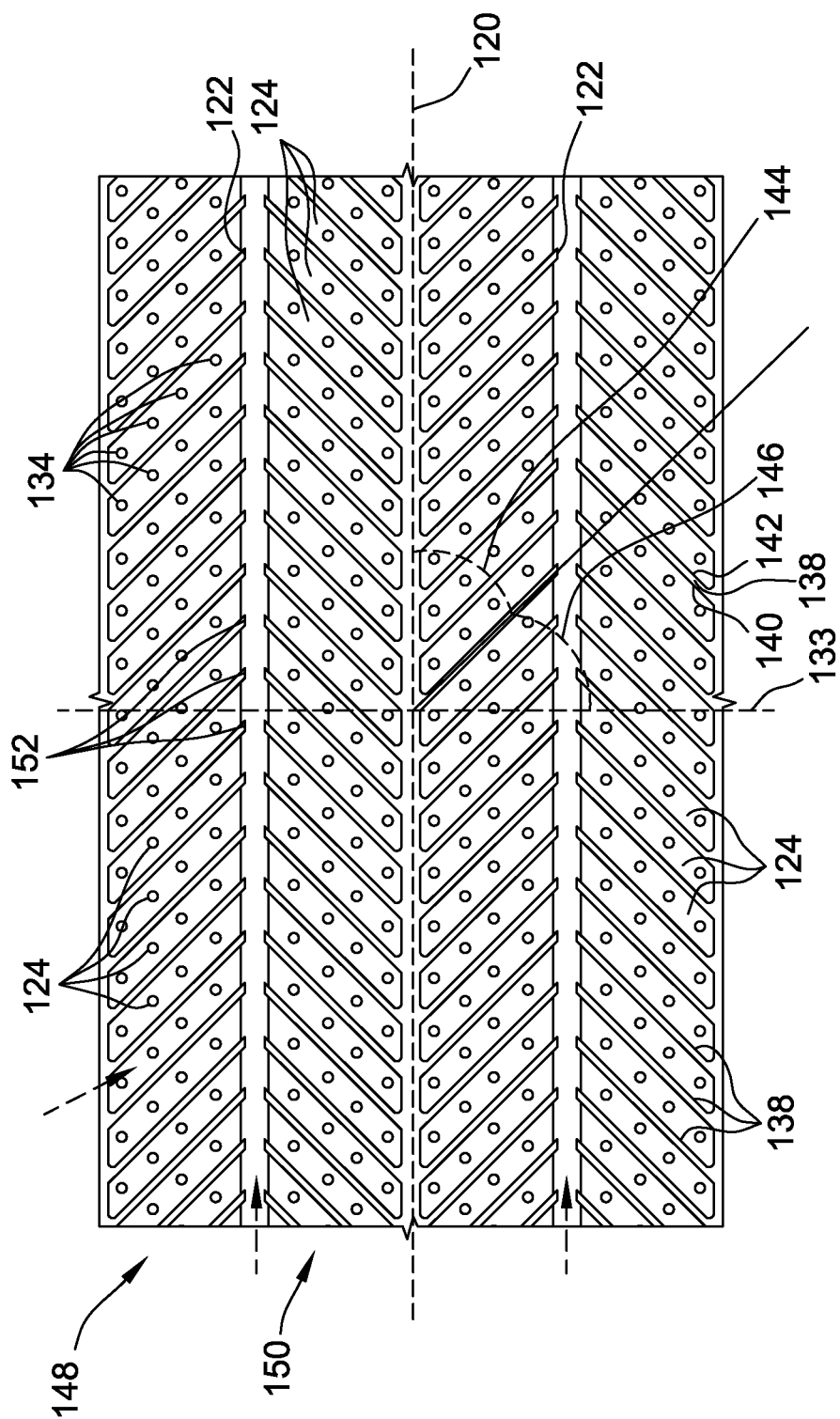
FIG. 5 is a schematic side view of angled channels of the component shown in FIG. 2.

FIG. 5 is a schematic side view of angled channels 124 of component 100. In reference to FIGS. 4 and 5, in the exemplary embodiment, a plurality of angled walls 138 extend between outer wall 102 and inner wall 104 to define a plurality of angled channels 124. In particular, angled walls 138 extend from first surface 130 to inner surface 128. Moreover, as shown in FIG. 4, angled walls 138 are substantially perpendicular to first surface 130 and inner surface 128. Angled walls 138 are configured such that each angled channel 124 is in flow communication with at least one supply plenum 106 via at least one of apertures 134. Also, in the exemplary embodiment, each angled wall 138 includes a first surface 140 and a second surface 142. First surface 140 and second surface 142 define a thickness of angled wall 138 therebetween. In alternative embodiments, component 100 includes any angled wall 138 that enables component 100 to operate as described herein.

Also, in the exemplary embodiment, angled walls 138 and angled channels 124 are angled and extend at least partially along longitudinal axis 120 of component 100. Accordingly, angled walls 138 direct cooling fluid at least partially along longitudinal axis 120. As a result, when cooling fluid enters recovery plenum 122 from multiple cooling channels 124, the cooling fluid flows at least partially in the same direction along longitudinal axis 120 to inhibit generation of flow structures that increase pressure loss and reduce system efficiency.

In addition, in the exemplary embodiment, each angled wall 138 extends at an angle 144 relative to longitudinal axis 120 and an angle 146 relative to a transverse axis 133. Each of angle 144 and angle 146 are acute angles. As used herein, the term "acute" refers to an angle between 0° and 90°. In alternative embodiments, angled walls 138 extend at any angle that enables component 100 to operate as described herein.

Moreover, in the exemplary embodiment, a first set 148 of angled channels 124 are positioned on a first side of recovery plenum 122 and a second set 150 of angled channels 124 are positioned on a second side of recovery plenum 122 opposite the first set of angled channels. First set 148 of angled channels 124 are substantially parallel and second set 150 of angled channels 124 are substantially parallel. First set 148 of angled channels 124 and second set 150 of angled channels 124 extend in different directions. Flow disturbances within recovery plenum 122 are decreased because the first set of angled channels 124 and the second set of angled channels direct cooling fluid into recovery plenum 122 in an at least partially longitudinal direction. In alternative embodiments, angled channels 124 direct fluid in any direction that enables component 100 to operate as described herein. In some embodiments, the angle of angled walls 138 is varied to "tune" impingement flow along recovery plenum 122, i.e., angled channels 124 are used to control characteristics of the impingement flow.

Also, in the exemplary embodiment, each angled channel 124 includes a channel outlet 152 defined by angled walls 138 for discharging fluid from angled channels 124 into recovery plenum 122. In the exemplary embodiment, channels outlets 152 are substantially similar to each other. In alternative embodiments, each angled channel 124 includes any channel outlet 152 that enables component 100 to operate as described herein. For example, in some embodiments, channel outlets 152 have different sizes and/or shapes.

In some embodiments, a shape and/or size of channel outlet 152 is preselected to provide a desired flow into recovery plenum 122. For example, in some embodiments, areas of channel outlets 152 are varied along recovery plenum 122 to "tune" impingement flow into recovery plenum 122 and change the amount of flow through apertures 134. In particular, decreasing the area of channel outlets 152 decreases the amount of flow through channel outlets 152 and through apertures 134. As a result, heat removed from component 100 is locally tuned and the temperature of component 100 is locally changed to achieve a more uniform temperature and reduce thermal gradients. In some embodiments, the area of channel outlets 152 is changed by changing angle 144 of angled channels 124. In particular, in some embodiments, downstream angled channels 124 have angles 144 that are less than angles 144 of upstream angled channels 124 such that areas of angled channels 124 correspond to pressure variations within recovery plenum 122.

Also, in the exemplary embodiment, apertures 134 are arranged in a pattern selected to facilitate effective impingement cooling of outer wall 102. For example, in some embodiments, the pattern of apertures 134 varies circumferentially and/or longitudinally along component 100 to facilitate local cooling requirements along respective portions of outer wall 102. In some embodiments, apertures 134 are each sized and shaped to emit cooling therethrough in a jet towards interior surface 128. For example, apertures 134 each have a substantially circular or ovoid cross-section. In alternative embodiments, component 100 has any aperture 134 that enables component 100 to operate as described herein. For example, in some embodiments, outer wall 102 also includes apertures extending therethrough (not shown) that channel fluid from angled channels 124 therethrough to provide film cooling of an exterior of outer wall 102.

In addition, in the exemplary embodiment, component 100 is formed from a nickel-based superalloy. In alternative embodiments, component 100 is formed from any material that enables component 100 to operate as described herein. For example, in some embodiments, component 100 is formed from at least one of a cobalt-based superalloy, an iron-based alloy, and a titanium-based alloy.

In reference to FIG. 4, in the exemplary embodiment, component 100 further includes a coating 154 on exterior surface 126 of outer wall 102. Coating 154 is formed from at least one material selected to protect outer wall 102 from the high temperature environment. For example, thermal barrier coating 154 includes a bond coat layer adjacent to, and configured to adhere to, exterior surface 126, and a thermal barrier outer layer adjacent to the bond coat layer. In alternative embodiments, component 100 includes any coating 154 that enables component 100 to operate as described herein.

In reference to FIGS. 1, 2, and 4, during operation, cooling fluid is supplied to plenums 106 through root end 116 of component 100. As the cooling fluid flows generally towards tip end 118, portions of the cooling fluid are forced through apertures 134 into angled channels 124 and impinge upon interior surface 128 of outer wall 102. Angled channels 124 direct the flow into recovery plenum 122 in a direction at least partially along longitudinal axis 120. In the exemplary embodiment, the used cooling fluid flows generally toward root end 116 through recovery plenums 122 and out of component 100. In some such embodiments, the arrangement of supply plenums 106, angled channels 124, and recovery plenums 122 forms a portion of a cooling circuit of rotary machine 10, such that used cooling fluid is returned to a working fluid flow through rotary machine 10. In some embodiments, cooling fluid is reused in any portion of rotary machine 10, such as in combustor section 16, upstream of combustor section 16, downstream of combustor section 16, within component 100, and/or within any other portion of rotary machine 10. Such embodiments provide an improved operating efficiency for rotary machine 10 as compared to cooling systems that exhaust used cooling fluid directly from component 100 into the working fluid within turbine section 18. Although impingement flow through plenums 106 and angled channels 124 and return flow through recovery plenum 122 is described in terms of embodiments in which component 100 is rotor blade 32 and/or stator vane 34, in alternative embodiments, any component 100 of rotary machine 10 includes a circuit of plenums 106, angled channels 124, and/or recovery plenums 122.

Figure 6:
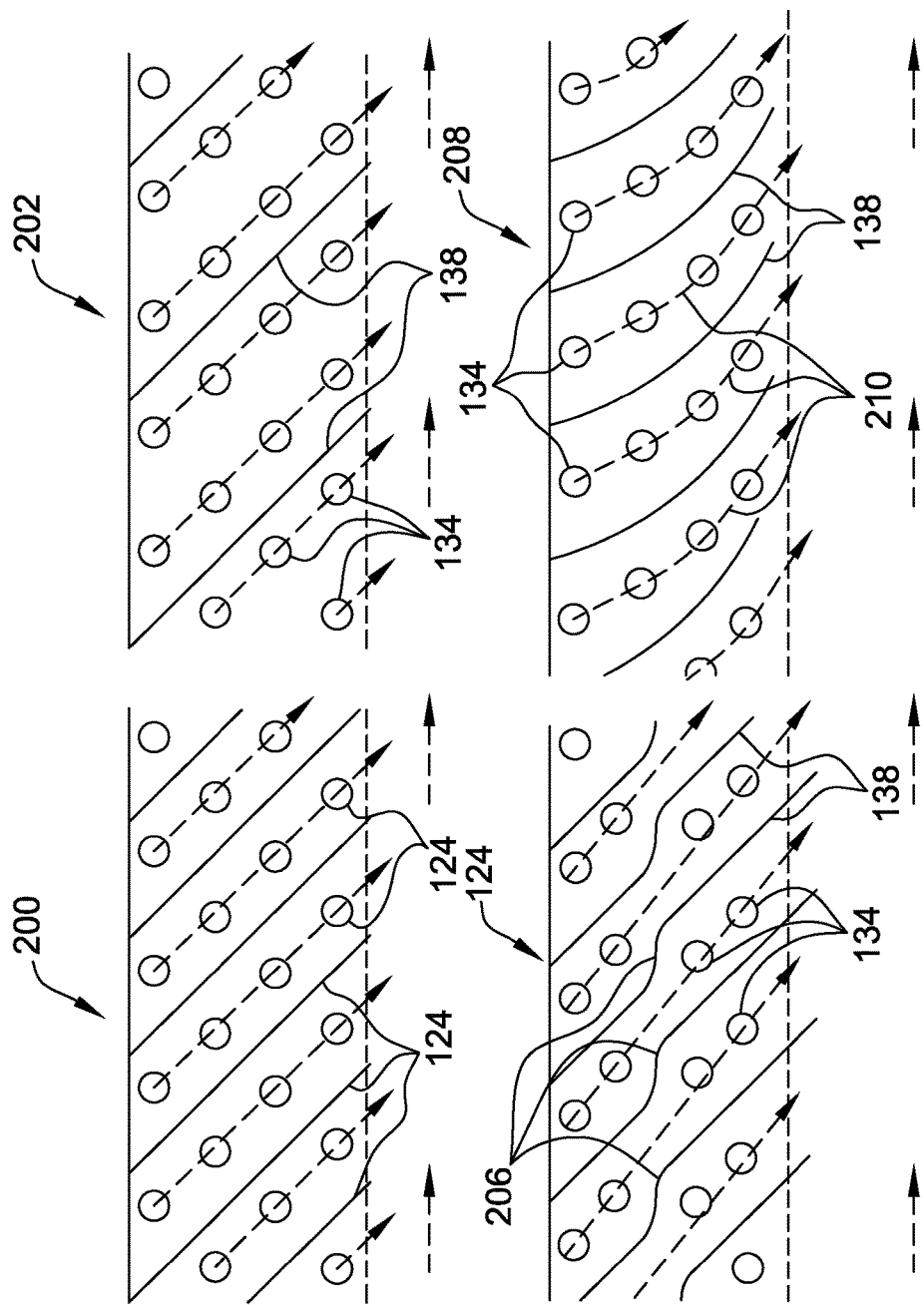
FIG. 6 is a schematic of alternative configurations of the angled channels shown in FIG. 5.

FIG. 6 is a schematic of alternative configurations of angled channels 124. In some embodiments, apertures 134 are aligned in rows along angled channels 124. In a first configuration 200, each angled channel 124 is in fluid communication with a single row of apertures 134. In a second configuration 202, each angled channel 124 is in fluid communication with a plurality of rows of apertures 134. In alternative embodiments, angled channels 124 are in fluid communication with any aperture 134 that enables component 100 (shown in FIG. 2) to operate as described herein.

In a third configuration 204, angled walls 138 include a curved portion 206. Curved portion 206 is configured to extend at least partially in a direction of expansion of outer wall 102, e.g., a longitudinal direction, to facilitate angled walls 138 supporting outer wall 102 during operation. In particular, curved portion 206 reduces stresses in component 100 (shown in FIG. 2) due to expansion of outer wall 102. In alternative embodiments, angled wall 138 includes any curved portion 206 that enables component 100 (shown in FIG. 2) to operate as described herein.

In a fourth configuration 208, each angled wall 138 is substantially curved such that cooling fluid is directed along a curved path 210 through angled channels 124 and towards recovery plenum 122. Curved path 210 facilitates cooling fluid flowing into recovery plenum 122 in a direction at least partially aligned with longitudinal axis 120. Accordingly, pressure variations in recovery plenum 122 are reduced. In addition, in the exemplary embodiment, the radius of curvature of angled walls 138 increases from outer wall 102 to inner wall 104. In alternative embodiments, angled wall 138 has any curve that enables component 100 (shown in FIG. 2) to operate as described herein.

The above-described embodiments provide components including a plurality of angled walls directing impingement cooling through angled channels. The angled walls provide support to the component and reduce stresses caused during thermal expansion of the component. In particular, the angled walls extend from an inner wall to an outer wall of the component to support the outer wall during operation. In addition, the angled channels direct cooling flow into a recovery plenum and reduce pressure losses along the recovery plenum. As a result, the embodiments described herein increase uniformity and efficiency of impingement cooling of components.

An exemplary technical effect of the methods, systems, and apparatus described herein includes at least one of: (a) reducing stress in components due to thermal expansion; (b) reducing pressure loss along a recovery plenum in a component cooling system; (c) increasing cooling uniformity of the component cooling system; and (d) improving an impingement heat transfer coefficient of the component cooling system.

Exemplary embodiments of internally impingement-cooled components are described above in detail. The components, and methods and systems using such components, are not limited to the specific embodiments described herein, but rather, components of systems and/or steps of the methods may be utilized independently and separately from other components and/or steps described herein. For example, the exemplary embodiments can be implemented and utilized in connection with many other applications that are currently configured to use components in high temperature environments.

Although specific features of various embodiments of the disclosure may be shown in some drawings and not in others, this is for convenience only. In accordance with the principles of the disclosure, any feature of a drawing may be referenced and/or claimed in combination with any feature of any other drawing.

This written description uses examples to disclose the embodiments, including the best mode, and also to enable any person skilled in the art to practice the embodiments, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A component configured for impingement cooling, said component comprising:
   an inner wall defining a plurality of apertures, each aperture of said plurality of apertures configured to emit a cooling fluid therethrough;
   an outer wall spaced from said inner wall and extending from a root end to a tip end of said component, wherein said outer wall and said inner wall extend along a longitudinal axis extending from said root end to said tip end of said component, and wherein said inner wall further defines a first surface and said outer wall defines a second surface opposite the first surface; and
   a plurality of angled walls extending between said first surface and said second surface, said plurality of angled walls defining a plurality of angled channels in fluid communication with said plurality of apertures, wherein each angled wall of said plurality of angled walls extends at an acute angle relative to the longitudinal axis.

2. The component in accordance with claim 1 further comprising at least one supply plenum that is at least partially defined by said inner wall, said at least one supply plenum configured to supply the cooling fluid to said plurality of apertures.

3. The component in accordance with claim 2 further comprising at least one recovery plenum that is at least partially defined by said inner wall and is in flow communication with said plurality of angled channels, said at least one recovery plenum configured to define a return flow path configured to return the cooling fluid to said at least one supply plenum.

4. The component in accordance with claim 3, wherein said at least one recovery plenum extends along the longitudinal axis and is configured to direct the cooling fluid in a first direction, said plurality of angled walls configured to direct the cooling fluid into said at least one recovery plenum at least partially in the first direction.

5. The component in accordance with claim 1, wherein each angled wall of said plurality of angled walls is perpendicular to said first surface and said second surface.

6. The component in accordance with claim 1, wherein each angled wall of said plurality of angled walls includes a first angled surface, a second angled surface, and a thickness defined between said first angled surface and said second angled surface.

7. The component in accordance with claim 1, wherein at least one angled wall of said plurality of angled walls includes a curved portion.

8. The component in accordance with claim 1, wherein at least one angled wall of said plurality of angled walls is curved and has a radius of curvature that increases from said outer wall to said inner wall.

9. The component in accordance with claim 1, wherein said plurality of angled walls include a first set of angled walls and a second set of angled walls, each angled wall of said first set of angled walls extending in a first direction, and each angled wall of said second set of angled walls extending in a second direction different from the first direction.

10. A rotary machine comprising:
a combustor section configured to generate combustion gases;
a turbine section configured to receive the combustion gases from said combustor section and produce mechanical rotational energy therefrom, wherein a path of the combustion gases through said rotary machine defines a hot gas path; and
a component proximate said hot gas path, said component comprising:
an inner wall defining a plurality of apertures, each aperture of said plurality of apertures configured to emit a cooling fluid therethrough;
an outer wall spaced from said inner wall and extending from a root end to a tip end of said component, wherein said outer wall and said inner wall extend along a longitudinal axis extending from said root end to said tip end of said component, wherein said inner wall further defines a first surface and said outer wall defines a second surface opposite the first surface; and
a plurality of angled walls extending between said first surface and said second surface, said plurality of angled walls defining a plurality of angled channels in fluid communication with said plurality of apertures, wherein each angled wall of said plurality of angled walls extends at an acute angle relative to the longitudinal axis.

11. The rotary machine in accordance with claim 10, wherein said component further comprises at least one supply plenum that is at least partially defined by said inner wall, said at least one supply plenum configured to supply the cooling fluid to said plurality of apertures.

12. The rotary machine in accordance with claim 10, wherein said component further comprises at least one recovery plenum that is at least partially defined by said inner wall and is in flow communication with said plurality of angled channels, said at least one recovery plenum configured to define a return flow path configured to return the cooling fluid to a portion of said rotary machine for reuse.

13. The rotary machine in accordance with claim 12, wherein said at least one recovery plenum extends along the longitudinal axis and is configured to direct the cooling fluid in a first direction, said plurality of angled walls configured to direct the cooling fluid into said at least one recovery plenum at least partially in the first direction.

14. The rotary machine in accordance with claim 10, wherein each angled wall of said plurality of angled walls is perpendicular to said first surface and said second surface.

15. The rotary machine in accordance with claim 10, wherein each angled wall of said plurality of angled walls includes a first angled surface, a second angled surface, and a thickness defined between said first angled surface and said second angled surface.

16. The rotary machine in accordance with claim 10, wherein at least one angled wall of said plurality of angled walls includes a curved portion.

17. The rotary machine in accordance with claim 10, wherein at least one angled wall of said plurality of angled walls is curved and has a radius of curvature that increases from said outer wall to said inner wall.

18. The rotary machine in accordance with claim 10, wherein said plurality of angled walls include a first set of angled walls and a second set of angled walls, each angled wall of said first set of angled walls extending in a first direction, and each angled wall of said second set of angled walls extending in a second direction different from the first direction.

* * * * *